United States Patent
Mochida et al.

(10) Patent No.: US 8,149,325 B2
(45) Date of Patent: Apr. 3, 2012

(54) EXPOSURE CONTROL APPARATUS AND EXPOSURE CONTROL PROGRAM FOR VEHICLE-MOUNTED ELECTRONIC CAMERA

(75) Inventors: Kentaro Mochida, Chiryu (JP); Takayuki Kimura, Kariya (JP)

(73) Assignee: DENSO CORPORATION, Kariya (JP)

( * ) Notice: Subject to any disclaimer, the term of this patent is extended or adjusted under 35 U.S.C. 154(b) by 679 days.

(21) Appl. No.: 12/318,144

(22) Filed: Dec. 22, 2008

(65) Prior Publication Data

US 2009/0174808 A1   Jul. 9, 2009

(30) Foreign Application Priority Data

Dec. 26, 2007   (JP) ................. 2007-334936

(51) Int. Cl.
*H04N 5/235*   (2006.01)
*G03B 7/08*    (2006.01)
(52) U.S. Cl. ................... 348/362; 396/234
(58) Field of Classification Search .......... 348/118–120, 348/362; 396/234
See application file for complete search history.

(56) References Cited

U.S. PATENT DOCUMENTS

| | | | |
|---|---|---|---|
| 5,255,044 A | 10/1993 | Ishiguro | |
| 5,565,918 A | 10/1996 | Homma et al. | |
| 5,703,644 A | 12/1997 | Mori et al. | |
| 7,251,056 B2 * | 7/2007 | Matsushima | 358/1.9 |
| 7,365,779 B2 | 4/2008 | Yamada | |
| 2001/0010540 A1 | 8/2001 | Ogura et al. | |
| 2005/0083428 A1 * | 4/2005 | Ohkawara | 348/345 |
| 2008/0024606 A1 | 1/2008 | Kawasaki | |
| 2008/0094471 A1 | 4/2008 | Usami et al. | |
| 2009/0097745 A1 | 4/2009 | Kim et al. | |

FOREIGN PATENT DOCUMENTS

| | | |
|---|---|---|
| JP | H06-253208 | 9/1994 |
| JP | 2005-148308 | 6/2005 |

OTHER PUBLICATIONS

Office Action dated on Apr. 5, 2011 from the U.S. Patent Office in related U.S. Appl. No. 12/318,146.
Office Action dated on Jun. 10, 2011 from the U.S. Patent Office in related U.S. Appl. No. 12/318,145.
Final Office Action dated on Sep. 29, 2011 from the U.S. Patent Office in related U.S. Appl. No. 12/318,146.
Final Office Action dated on Nov. 25, 2011 from the U.S. Patent Office in related U.S. Appl. No. 12/318,145.

* cited by examiner

*Primary Examiner* — Clayton E LaBalle
*Assistant Examiner* — Leon W Rhodes, Jr.
(74) *Attorney, Agent, or Firm* — Posz Law Group, PLC

(57) ABSTRACT

In an exposure control apparatus for a vehicle-installed camera which captures images of an external scene ahead of the vehicle as arrays of picture elements, a measured brightness value is obtained from each image based on respective spatial-domain average brightness values of a plurality of picture element groups, such as horizontal rows of picture elements. For each of at least part of the groups, time-axis filtering is applied to a plurality of average brightness values that have been successively obtained for that group, to obtain an average brightness values with reduced effect of time-axis variations in brightness.

7 Claims, 14 Drawing Sheets

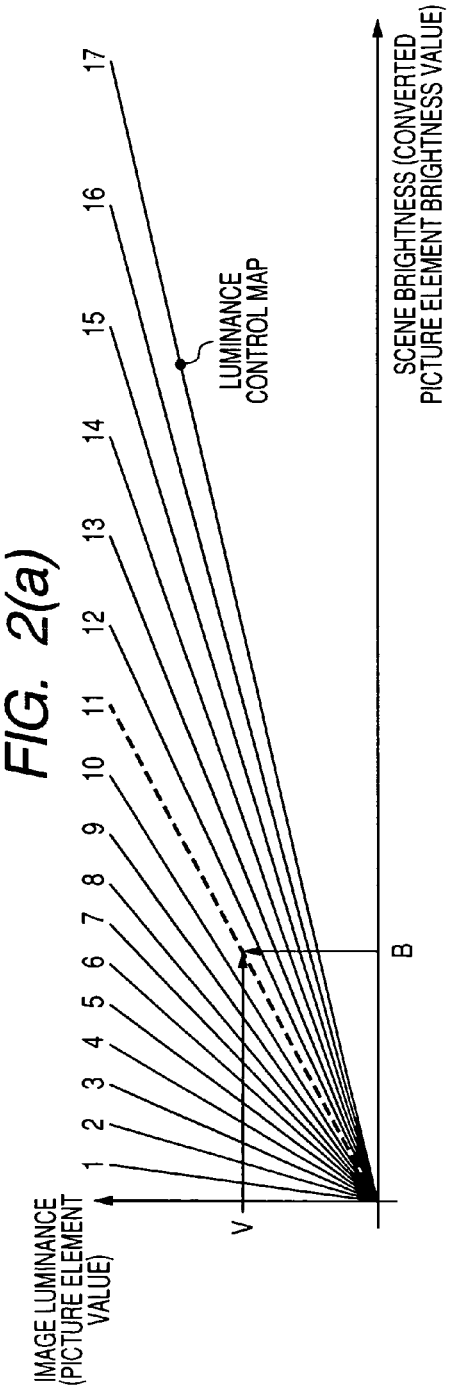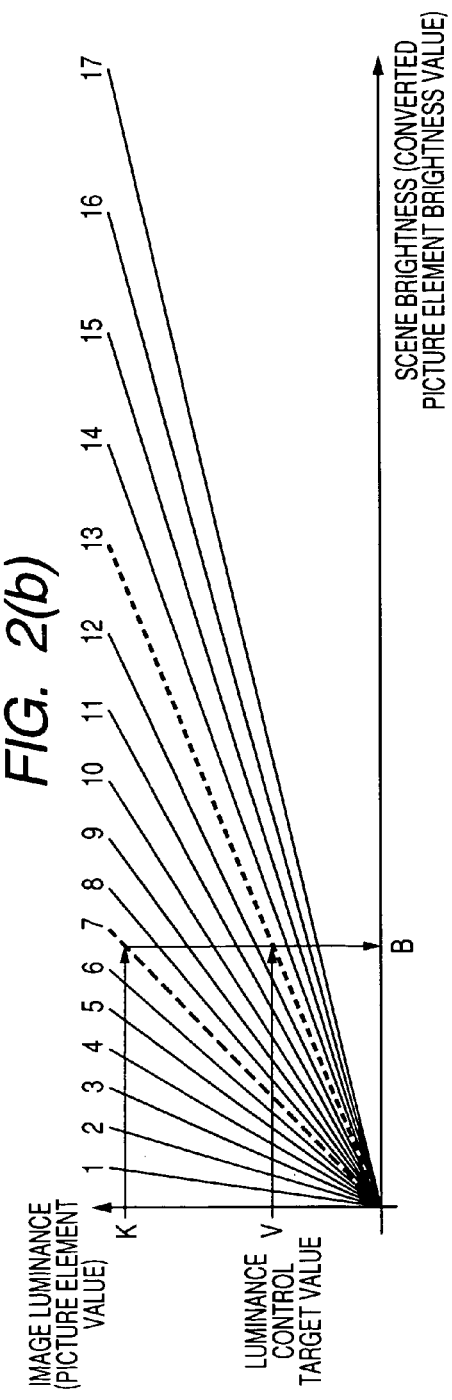

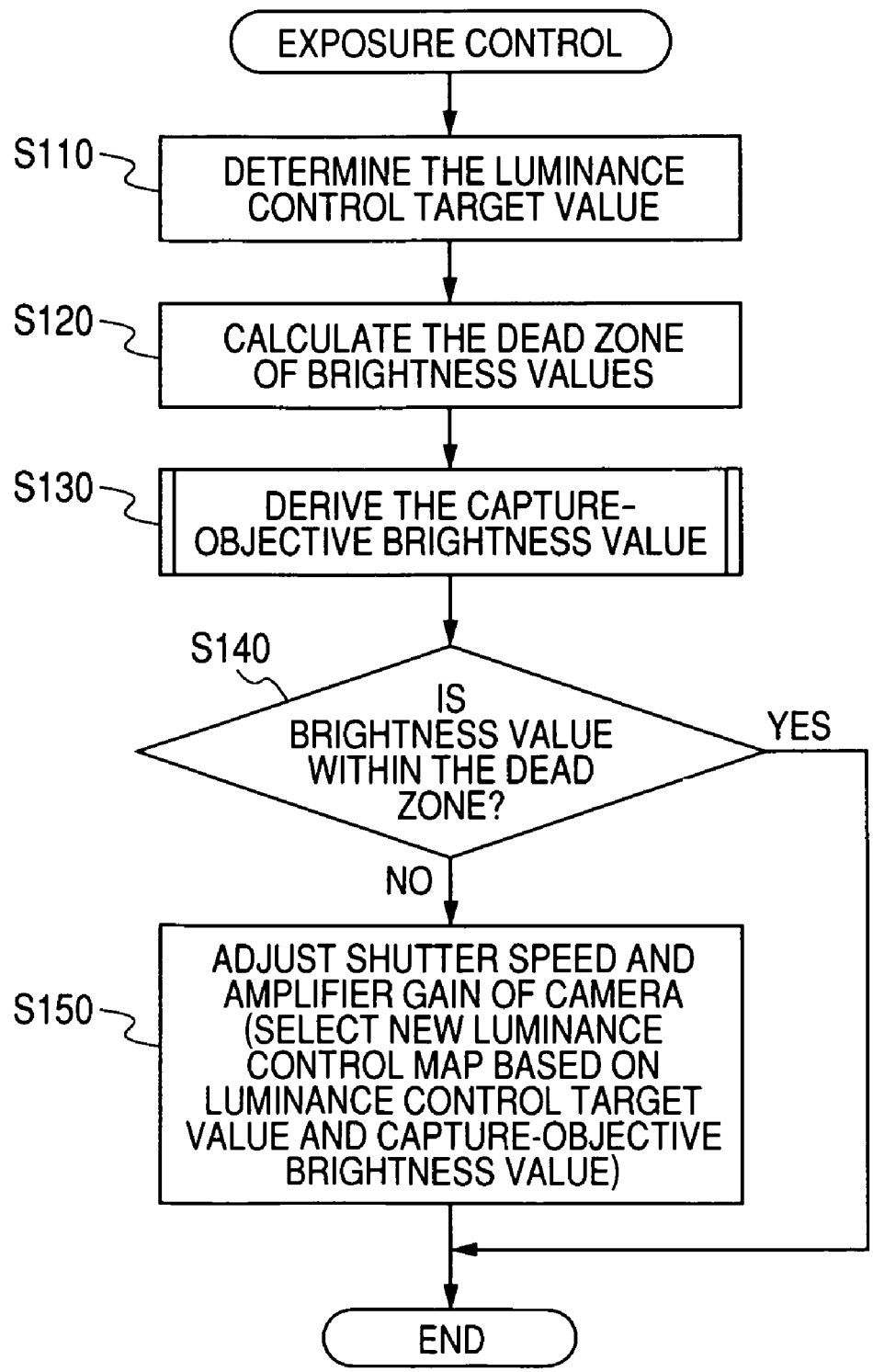

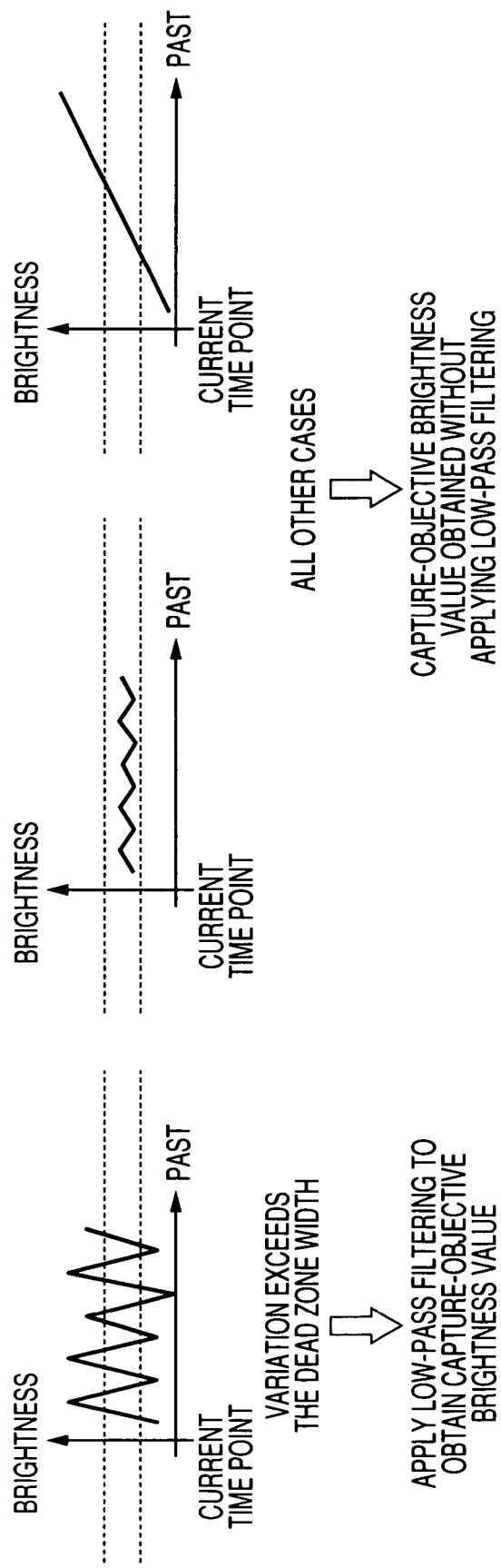

EXPOSURE CONTROL APPARATUS AND EXPOSURE CONTROL PROGRAM FOR VEHICLE-MOUNTED ELECTRONIC CAMERA

CROSS-REFERENCE TO RELATED APPLICATIONS

This application is based on and incorporates herein by reference Japanese Patent Application No. 2007-334936 filed on Dec. 26, 2007. This application is also related to U.S. application Ser. No. 12/318,145, entitled EXPOSURE CONTROL APPARATUS AND EXPOSURE CONTROL PROGRAM FOR VEHICLE-MOUNTED ELECTRONIC CAMERA, and Ser. No. 12/318,146 entitled EXPOSURE CONTROL APPARATUS AND EXPOSURE CONTROL PROGRAM FOR VEHICLE-MOUNTED ELECTRONIC CAMERA, both simultaneously filed on Dec. 22, 2008 with the present application.

BACKGROUND OF THE INVENTION

1. Field of Application

The present invention relates to an exposure control apparatus, for exposure control of an electronic camera which captures successive images of a region ahead of a vehicle in which the camera is installed.

2. Description of Related Art

In recent years, vehicle-installed electronic cameras (in general, digital video cameras, referred to in the following simply as cameras) have come into use for capturing images of a region located ahead of the vehicle, with technology having been developed whereby the captured images (sets of digital data expressing respective captured images) are processed for such functions as recognition of white lines formed on the road surface or detection of objects such as a preceding vehicle. The processing results can be used to generate warning indications to a vehicle driver, control driving of the vehicle, etc.

With such technology, it is important that the exposure of the camera be appropriately controlled in accordance with brightness of the scene which is being captured by the camera, in order to maximize the reliability of recognizing white lines on the road surface or solid objects such as preceding vehicles, etc., based on the images captured by the camera.

A vehicle having such a camera and processing apparatus installed therein, which are being described, is referred to in the following as the "local vehicle".

As described for example in Japanese patent first publication No. 6-253208 (designated as reference document 1 herein), a method of using such camera images for recognition of white lines on the road surface has been proposed whereby two laterally extending sections are selected within each image. A first one of these sections is positioned to contain a part of the road surface that is currently close to the local vehicle, and the data obtained from the first section, in each of successive captured images, are utilized for recognition of white lines on the road surface. The second section is positioned to contain a part of the road surface that is farther ahead of the local vehicle (i.e., is in an upper part of each captured image). Hence the second section contains a region which will be subjected to recognition processing at a future time point, determined by the speed at which the local vehicle is travelling. Designating the average brightness levels of the first and second sections as b0 and b1 respectively, the difference between these is obtained for each of successive captured images. If the difference is found to exceed a predetermined threshold value, then the camera exposure which will be applied in capturing the next image is adjusted based on the brightness value b1 (i.e., by changing the camera shutter speed, etc).

With the above method of reference document 1, if for example the road surface ahead of the vehicle changes between a brightly sunlit condition and a shade condition, the camera exposure can be appropriately controlled for each of successive captured images, i.e., such as to prevent the abrupt change in scene brightness from affecting the reliability of white line detection.

However in an actual road environment, the brightness of the road surface will not generally change between a sunlit condition and a shade condition (with the change extending uniformly across the road surface) in such a simple manner. Instead, the changes can take various forms. For that reason, it is difficult to reliably control the camera exposure by such a method under actual operating conditions.

It has also been proposed, for example in Japanese patent first publication No. 2005-148308 (designated as reference document 2 herein) to use an exposure control apparatus whereby the brightness of the road surface ahead of a local vehicle is measured for use in camera exposure control, while excluding the effects of white lines (traffic lane markers) formed on the road surface. A video camera on the vehicle obtains successive captured images of a region directly ahead of the vehicle, and a plurality of brightness measurement regions are determined, within each image, which are designed to exclude these white lines. The exposure of the vehicle-mounted camera is controlled based on measured brightness values of these brightness measurement regions. However it is difficult to form and locate these brightness measurement regions such as to ensure that the white lines will be consistently excluded from them. Hence it has been difficult, in practice, to use such brightness measurement regions for performing reliable brightness measurement based on brightness values in these regions.

With a vehicle-installed exposure control apparatus, it is necessary to achieve a high speed of processing. This can be increased by applying processing to only a part of the picture elements which constitute the brightness measurement region, rather than deriving brightness values based upon all of these picture elements. However if this is done, the problem arises that dispersed large-amplitude variations may occur in the brightness values of some parts of the brightness measurement region. This is especially true for part of the brightness measurement region which correspond to external regions that are relatively distant.

One reason for this will be described referring to the example of FIG. 17, which relates to an exposure control apparatus in which "thinning-out" is applied whereby some picture lines (rows of picture elements) 52 are excluded from a brightness measurement region in a captured image 48, i.e., brightness values of these picture lines are omitted from being used in brightness measurement processing. The upper diagram in FIG. 17 conceptually shows a captured image in which a preceding vehicle 50 appears, with light emitted from the tail lamps 51 of the vehicle 50 appearing in the image at positions corresponding to one of the excluded picture lines 52, as indicated by the arrow 53. When pitching motion of one or both of the vehicles occurs, then in a subsequent image as illustrated by the lower diagram, the light from the tail lamps 51 may correspond to positions other than the excluded picture lines 52, as indicated by arrow 54. Hence, a large increase in the measured brightness value obtained for this image (e.g., average brightness of the brightness measurement region)

will occur. Such fluctuations in measured brightness values make it difficult to apply effective exposure control.

The greater the distance of a light source such as a preceding vehicle tail lamp, etc., the smaller will be the apparent size of the light source within a captured image. Hence, such fluctuations in brightness will increase in accordance with increasing distance of external regions represented in an image.

SUMMARY OF THE INVENTION

It is an objective of the present invention to overcome the above problems by providing an exposure control apparatus whereby appropriate control of camera exposure can be achieved.

To achieve the above objectives, from a first aspect, the invention provides an exposure control apparatus for performing exposure control (i.e., adjusting the exposure condition by changing the shutter speed, etc., when necessary) of an electronic digital camera such as a digital video camera that is installed on a vehicle for periodically capturing images of an external scene ahead of the vehicle as respective arrays of picture elements having respective luminance values. The apparatus is configured to convert the luminance values to corresponding brightness values of the external scene in accordance with a predetermined relationship between the current exposure condition of the camera, the luminance values and the brightness values. The apparatus basically comprises extraction circuitry, calculation circuitry, measurement circuitry and exposure control circuitry.

The extraction circuitry selects, from each captured image, a plurality of groups of picture elements to constitute a brightness measurement region. The calculation circuitry calculates respective average brightness values of the plurality of picture element groups and, for each of the groups, applies time-axis filter processing to successively obtained average brightness values obtained for the group (i.e., which have been successively obtained from periodically captured images, up to the current point in time), for smoothing out variations which may occur in the average brightness values. The measurement circuitry calculates a brightness value for use in exposure control, referred to in the following as the capture-objective brightness value, based on respective average brightness values obtained for the picture element groups following the time-axis filter processing. The exposure control circuitry performs exposure control (shutter speed adjustment, etc.) of the camera, based on the capture-objective brightness value calculated by the measurement circuitry.

The invention is characterized in that the effectiveness (i.e., resultant degree of smoothing) of the time-axis filtering applied to respective picture element groups is increased in accordance with increasing distance of the external regions corresponding to these groups (i.e., regions within the external scene captured in an image). Preferably, in the case of a picture element group corresponding to an external region that is closely adjacent to (is immediately ahead of) the local vehicle, no time-axis filter processing is applied.

More stable and accurate brightness measurement can thereby be achieved, with reduced fluctuations in measured brightness due to the effects of light sources such as tail lamps of preceding vehicles or headlamps of oncoming vehicles, etc. More effective and reliable exposure control can thereby be achieved.

From another aspect, the calculation circuitry is preferably configured to judge (for each picture element group) the extent of dispersion of brightness values within a plurality of successively obtained brightness values corresponding to that group (i.e., which have been obtained up to the current point in time), and to determine whether or not time-axis filtering processing is applied for that group, based on the judgement result.

The picture element groups are preferably respective picture lines, each comprising a horizontal row of picture elements of a captured image.

From another aspect, the measurement circuitry can be configured to apply low-pass filter processing to a (currently obtained) preliminary capture-objective brightness value, i.e., low-pass filter processing using that preliminary value and one or more precedingly obtained capture-objective brightness values, for obtaining a capture-objective brightness value that will be used in exposure control.

Preferably, the measurement circuitry is configured to judge the extent of dispersion among a plurality of successively obtained capture-objective brightness values (i.e., values which have been successively obtained for respective images, up to the current point in time), and to determine whether the low-pass filter processing is to be applied for obtaining the capture-objective brightness value for use in exposure control, or the preliminary capture-objective brightness value is to be used directly, with the determination being based upon the judgement result.

An exposure control apparatus according to the present invention can be advantageously implemented by processing performed in accordance with a program executed by a computer.

BRIEF DESCRIPTION OF THE DRAWINGS

FIG. 2 shows examples of exposure control maps for use with the embodiment;

FIG. 3 is a flow diagram of exposure control processing executed by the embodiment;

FIG. 14 shows diagrams illustrating an operation of judging whether a capture-objective brightness value for use in exposure control is to be obtained by low-pass filter processing;

DESCRIPTION OF PREFERRED EMBODIMENTS

Figure 1:
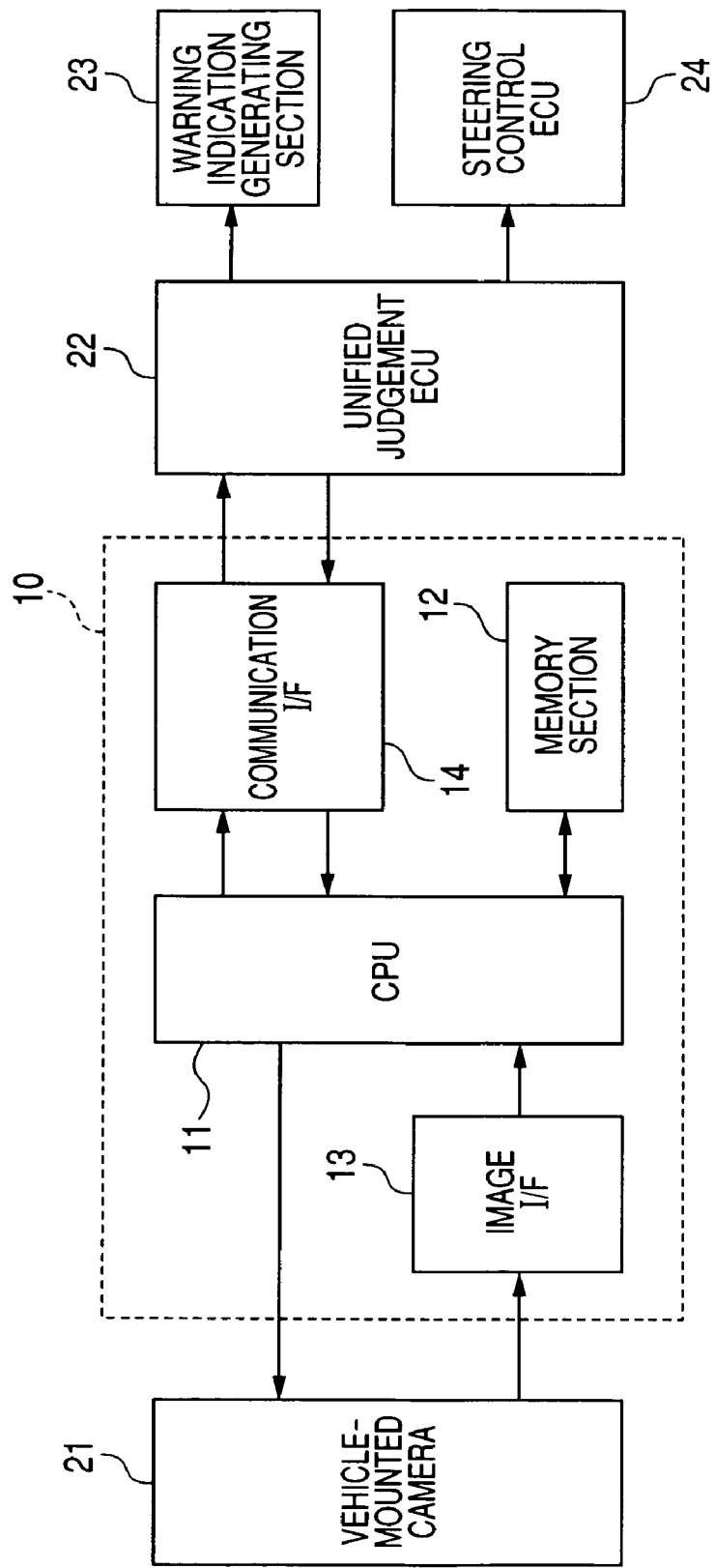
FIG. 1 is a general block diagram of a vehicle system incorporating an embodiment of an exposure control apparatus.

An embodiment of an exposure control apparatus for a vehicle-mounted camera will be described in the following referring to the drawings.

1. Overall Configuration

FIG. 1 is a block diagram showing the general configuration of a exposure control apparatus 10 and its relationship to other components of a vehicle system. The exposure control apparatus 10 is installed in a vehicle (the "local vehicle") and is connected to a vehicle-mounted digital video camera (referred to in the following simply as the camera) 21 and to a unified judgement section 22, with the unified judgement section 22 being connected to a warning indication generating section 23 and a steering control ECU 24 as shown, Data obtained by the exposure control apparatus 10 based on the contents of captured images of a scene ahead of the local vehicle are used in warning indication processing and steering control processing that are executed by the unified judgement section 22.

The exposure control apparatus 10 consists of a CPU 11, a memory section 12, an image interface 13 which transfers data of successive captured images from the camera 21 to the CPU 11, and a communication interface 14 for executing communication with the unified judgement section 22. The memory section 12 includes a non-volatile memory such as a ROM (read-only memory, not shown in the drawings) having programs and data including a plurality of luminance control maps (described hereinafter) stored therein beforehand, and a RAM (random-access memory, not shown in the drawings) and data registers, for storing and processing data of a plurality of images which have been successively captured up to the current point in time.

The camera 21 is installed within the passenger compartment of the local vehicle at a fixed position (for example, beside the rear view mirror), and captures successive images (i.e., as respective video signal frames) of a region of the road ahead of the vehicle. When installed in the vehicle, the orientation of the camera 21 is adjusted such as to set a specific image capture range with respect to the direction of advancement of the vehicle.

The camera 21 incorporates a usual type of CCD or CMOS image sensor, together with a video amplifier, A/D (analog-to-digital) converter, etc. When an image is captured by the image sensor, as an analog signal expressing successive luminance values, the video amplifier applies a specific amount of gain to the analog signal, which is then converted to successive digital values (luminance values of picture elements) by the A/D converter, and stored as data in the memory section 12. The CPU 11 then reads out and processes the image data, operating separately on respective picture lines of the image, where each picture line is a horizontal row of picture elements (horizontal scan line) of the image.

The image interface 13 transfers the picture element values, together with horizontal and vertical synchronizing signals of the image, from the camera 21 to the CPU 11. The CPU 11 determines respective image positions corresponding to each of the picture elements, based upon the horizontal and vertical synchronizing signals. The picture element values are then stored in the memory section 12, in correspondence with position information specifying the respective locations of the picture elements within the image.

The CPU 11 processes the image data to perform recognition of a specific type of object (target object) such as a preceding vehicle which may be located ahead of the local vehicle and appear in the captured images. Based on the recognition processing results, the CPU 11 supplies position information concerning any target object to the unified judgement section 22 via the exposure control apparatus 10.

In addition, the CPU 11 controls the camera 21 such as to appropriately capture images of the scene ahead of the vehicle. Specifically, the CPU 11 adjusts the frame rate and the exposure parameters of the camera 21, by generating corresponding adjustment commands and supplying these to the camera 21 as camera control command values. In the following it is assumed that the exposure parameters of the camera 21 are the shutter speed and video amplifier gain.

The communication interface 14 enables communication between the CPU 11 and the unified judgement section 22, for transferring to the unified judgement section 22 the above-described information concerning results of target object recognition. Based on this information, the unified judgement section 22 judges whether there is a danger of collision between the local vehicle and a target object. When it is judged that such a danger exists, the unified judgement section 22 controls the warning indication generating section 23 to generate a warning indication to the vehicle driver. If the danger is judged to be above a predetermined level, then in addition to generating a warning indication, the unified judgement section 22 also instructs the steering control ECU 24 to perform appropriate steering control of the vehicle. Specifically, this may be control whereby the amount of steering assistance that is applied to the steering mechanism is adjusted appropriately, or whereby the steering mechanism is controlled to be automatically driven such as to avoid the danger of collision.

2. Outline of Exposure Control

The camera exposure control operation of this embodiment will be summarized in the following. The exposure control apparatus 10 data has stored therein beforehand expressing a plurality of characteristics referred to in the following as luminance control maps. Each of these corresponds to a specific exposure condition of the camera 21 (specific combination of shutter speed and video amplifier gain), and expresses the relationship between the brightness of an external scene ahead of the vehicle which is captured as an image by the camera 21, and resultant luminance values of picture elements of the image. The picture element luminance values are supplied from the camera 21 as respective digital values.

FIG. 2 shows an example of such a plurality of luminance control maps, with values of external scene brightness plotted along the horizontal axis and image luminance (picture element luminance values, as obtained from the camera) along the vertical axis.

In the example of diagram (a) of FIG. 2, if the image luminance (e.g., average of a plurality of picture element values) is a value V (referred to herein as a luminance control target value, which is predetermined as being an appropriate value of image luminance), when a capture-objective brightness value (measured as described hereinafter) is B and the luminance control map 11 is being used, then this is a condition in which the camera exposure parameters (shutter speed, video amplifier gain), determined by the luminance control map 11, are correctly set.

Referring to diagram (b) of FIG. 2 however in which the luminance control map No. 7 is being used, with the capture-objective brightness value B being as shown, the image luminance value deviates from the target value V, i.e., takes the value K, so that the camera exposure is not correctly set. In that case the apparatus performs exposure control by selecting the luminance control map No. 13, so that the image luminance will be restored to the target value V. Exposure control is thereby applied such as to maintain the image luminance close to an appropriate value, irrespective of variations in brightness of the scene that is captured by the camera.

The luminance control target value is determined in accordance with the luminance control map which is currently selected, i.e., there is a predetermined relationship between the luminance control map numbers and the luminance control target values, as described hereinafter.

With this embodiment, instead of measuring the scene brightness based on all of the picture elements of a captured image from the camera 21 it is derived based on a fixedly predetermined part of each image, having a specific shape, location and size, referred to as the brightness measurement region.

The exposure control apparatus 10 of this embodiment basically performs exposure control in accordance with the following sequence of operations (1) to (4).

(1) Determination of Luminance Control Target Value

The luminance control target value is determined in accordance with the currently selected luminance control map, based on the aforementioned predetermined relationship, and varies between a day value and a night value. To ensure that the control conditions do not change abruptly, the luminance control target value varies only gradually during each transition between the day value and night value.

(2) Calculation of Dead Zone

A dead zone (illustrated in FIG. 5) of brightness values is determined, as described hereinafter.

(3) Derivation of Capture-Objective Brightness Value

Figure 7:
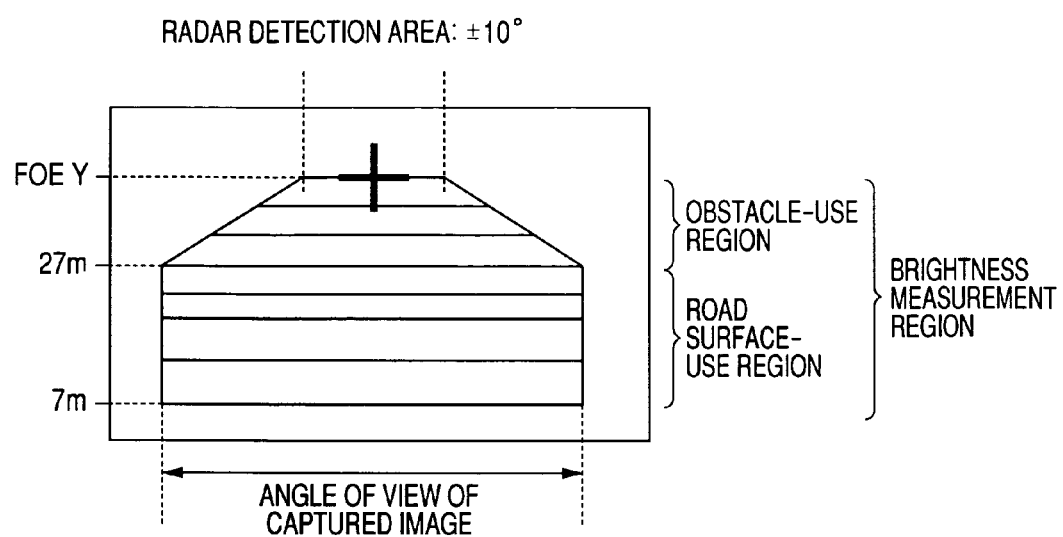
FIG. 7 illustrates the form of a brightness measurement region of an image.

As shown in FIG. 7, two adjoining regions within each captured image constitute the brightness measurement region of this embodiment, i.e., a road surface-use region for measuring the brightness of the road surface, and a target object-use region for measuring the brightness of a portion of the external scene which may contain a preceding vehicle, i.e., an object which is to be subjected to recognition processing. With this embodiment, respectively different forms of weighted-averaging processing are applied to these two regions, and a capture-objective brightness value is obtained as a combination of resultant average values calculated for the two regions.

(4) Control of Amplifier Gain and Shutter Speed

If the capture-objective brightness value obtained by operation (3) is found to be outside the dead zone, an appropriate other one of the luminance control maps is selected to be used, based upon the luminance control target value determined in operation (1) and upon the capture-objective brightness value obtained in operation (3), as described above referring to diagram (b) of FIG. 2. The exposure condition (shutter speed and amplifier gain) of the camera 21 is then adjusted in accordance with the newly selected luminance control map.

3. Processing Executed by CPU

The CPU 11 periodically (e.g., once in every 100 ms) executes a processing routine in accordance with a stored program, as exposure control processing. In this processing, a capture-objective brightness value is derived based upon data of one or more images that have been successively acquired up to the current point in time from the camera 21 and stored in the memory section 12. Based on this capture-objective brightness value, the luminance control map is changed if necessary, and the camera exposure parameters (shutter speed, amplifier gain) adjusted accordingly. This processing will be described referring to the flow diagram of FIG. 3.

When processing begins, the CPU 11 first (step S110) determines a luminance control target value. Specifically, a correspondence relationship (shown as the full-line characteristic in the diagram (c) of FIG. 4) is stored beforehand, relating luminance control map numbers (e.g., the map numbers 1 to 17 shown in FIG. 2), plotted along the horizontal axis, to luminance control target values which are along the vertical axis. Based on that correspondence relationship, a luminance control target value is derived in accordance with the number of the luminance control map which is currently being used.

At the first execution of the processing routine of FIG. 3 (when operation of the system is started), a predetermined one of the luminance control maps is selected to be utilized, and the corresponding luminance control target value is obtained.

Figure 4A:
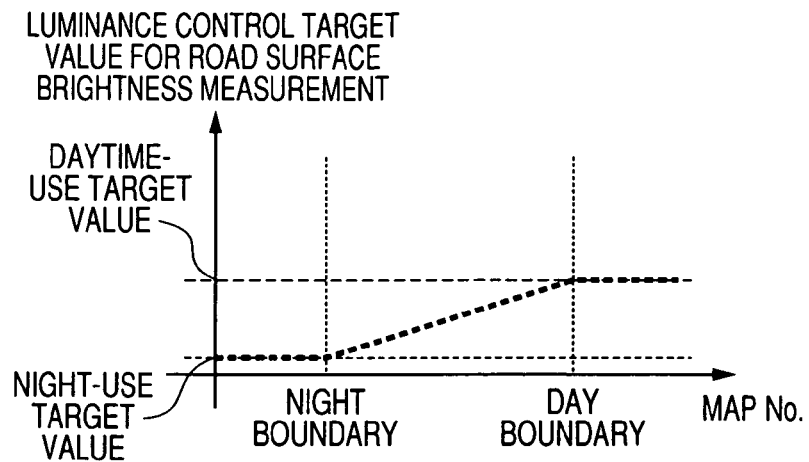
FIG. 4 shows diagrams for use in describing a way of setting luminance control target values which are used with the embodiment.
Figure 4B:
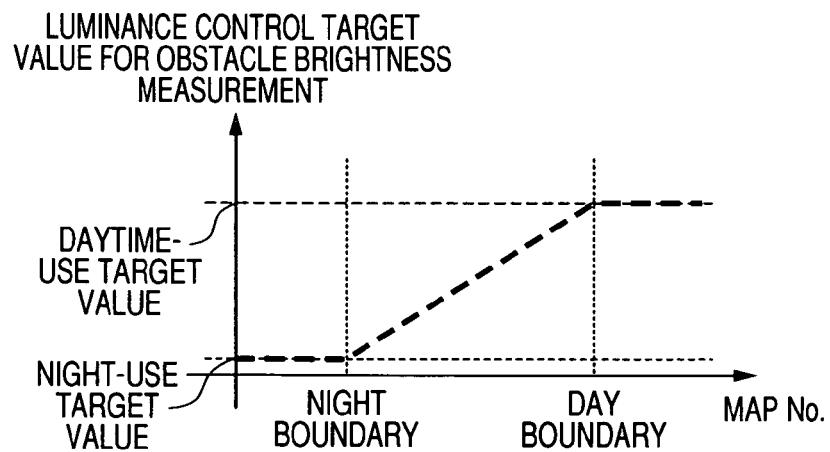
Figure 4C:
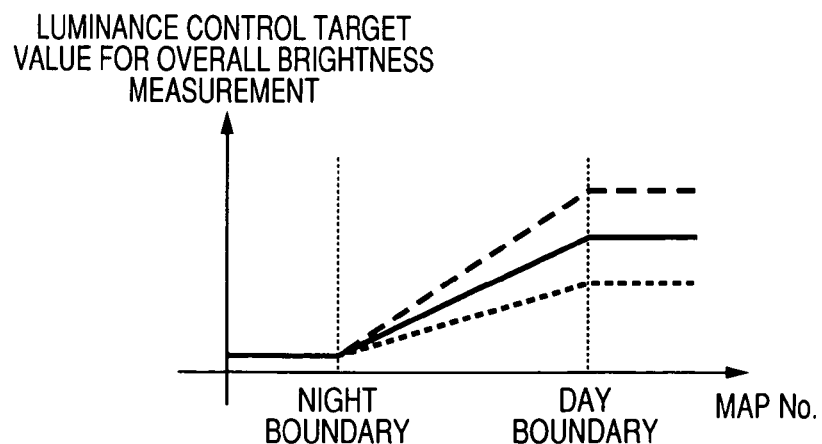

The correspondence relationship of FIG. 4(c) is derived by averaging the correspondence relationships of FIGS. 4(a) and 4(b), which are respectively shown as a dotted-line characteristic and as a broken-line characteristic in FIG. 4(c). FIG. 4(a) is a relationship between luminance control map numbers (plotted along the horizontal axis) to road surface luminance control target values (along the vertical axis) which is appropriate for the aforementioned road surface-use region of the brightness measurement region (i.e., an image region containing a part of the road surface that is close to and directly ahead of the local vehicle). FIG. 4(b) is a corresponding relationship which is appropriate for the target object-use region of the brightness measurement region.

Hence with this embodiment, each luminance control target value is not simply determined as being appropriate for an image region which may contain a target object (preceding vehicle) that is to be detected by recognition processing, but instead is derived as a combination of values that are appropriate for a target object and for the road surface, respectively.

When the average scene brightness is low (in general, at night), luminance control maps having low numbers will be selected for use, whereas when the average scene brightness is high (during daytime), maps having high numbers will be utilized. With this embodiment as illustrated in FIG. 4, the relationship between the luminance control target values and map value numbers is predetermined such that a low luminance control target value is selected during night operation and a higher luminance control target value is selected during daytime operation. This is done to ensure that the apparatus will function correctly even when large-scale increases in image luminance occur during night-time operation (e.g., due to light received from sources such as headlamps of oncoming vehicles, etc.).

Also as shown, there is a gradual transition between the night-use luminance control target value and the daytime-use luminance control target value, to prevent abrupt changes in image luminance. Since the luminance control target value is selected in accordance with the luminance control map which is currently in use, the gradual transition is achieved by appropriately relating the luminance control target values to the luminance control map numbers.

Figure 5:
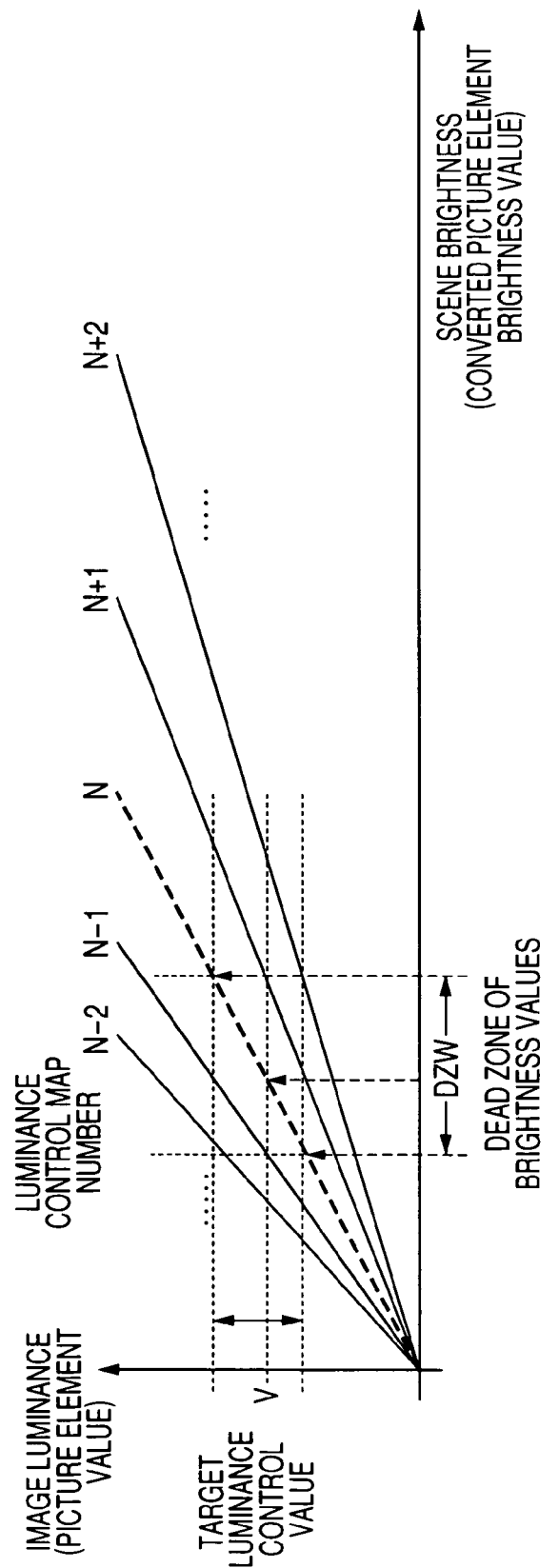
FIG. 5 is a diagram for describing a dead zone of brightness values.

Next in step S120, the dead zone is calculated. This is a range of brightness values for use in judging whether it is necessary to adjust the camera exposure (select another luminance control map). The dead zone is used to prevent unnecessary frequent changes in the exposure condition. Specifically as shown in FIG. 5, designating the luminance control map that is currently being used as map N, and designating the corresponding luminance control target value (obtained in step S110) as V, the dead zone is defined as a scene brightness range extending between the intersections of the luminance control target value V with the two adjacent luminance control maps (N−1) and (N+1) (i.e., maps whose numbers immediately precede and immediately succeed that of the currently selected luminance control map).

Next in step S130, processing is performed to obtain the capture-objective brightness value. This is based on converting the picture element luminance values of the brightness measurement region to corresponding converted brightness values by using the luminance control map which is currently selected, and will be described referring to the flow diagram of FIG. 6.

Firstly in step S131, the picture element values of the brightness measurement region are acquired, in units of picture lines. As shown in FIG. 7, the brightness measurement region of this embodiment is formed of a trapezoidal region constituting the aforementioned target object-use region, i.e., a region located some distance ahead of the local vehicle, at a position where a preceding vehicle may appear in the image, and a rectangular region constituting the aforementioned road surface-use region, corresponding to a part of the road which is immediately ahead of the local vehicle, for measuring the brightness of the road surface. The image luminance value is measured as a combination of values that are derived from the target object-use region and the road surface-use region.

Specifically, the road surface-use region has a vertical dimension (height dimension) corresponding to an area that extends approximately 7 to 27 meters ahead from the front of the local vehicle, and a width dimension (lateral dimension) determined such as to contain the two white lines which are located respectively at the right and left sides of a traffic lane in which the local vehicle is running.

The uppermost part of the target object-use region is set at the FOE (focus of expansion) position for the camera 21. The width of that uppermost part is made equal to the typical azimuth extent (±10°) of a region scanned by a millimeter-wave radar apparatus which may be installed in the local vehicle, for scanning the scene ahead of the vehicle with radar waves and judging the position, shape, speed, etc., of preceding objects based on resultant reflected radar waves.

The trapezoidal shape of the target object-use region successively widens towards the upper part of the road surface-use region, i.e., it is formed of picture lines that are of successively increasing length, whereas the road surface-use region is formed of full-width picture lines (corresponding to the full horizontal angle of view of the camera 21). This shape of the target object-use region is used to ensure that the camera exposure can be rapidly adjusted when another vehicle cuts in ahead of the local vehicle, i.e., to provide a seamless transition between detecting the brightness of the road surface and detecting the brightness of a preceding vehicle.

Since the external region ahead of the local vehicle that is beyond the FOE will generally contain features such as sky, buildings, etc., which are not relevant as target objects, it is ensured that these are excluded from the captured images, and so will not have an adverse effect upon exposure control.

To reduce the data processing load, thinning-out of picture lines is performed (i.e., with one out of each of successive pluralities of picture lines of the image being omitted) when extracting picture elements constituting the brightness measurement region. In the road surface-use region, thinning-out of picture lines is performed at periodic spacings which are approximately identical to one another with respect to distance from the local vehicle. That is to say, the higher the positions of the lines within the brightness measurement region, the smaller is made the proportion of lines omitted by the thinning-out processing. In the target object-use region, the thinning-out is performed at regular spacings, i.e., the spacing between lines that are omitted by the thinning-out processing is held constant.

Figure 8:
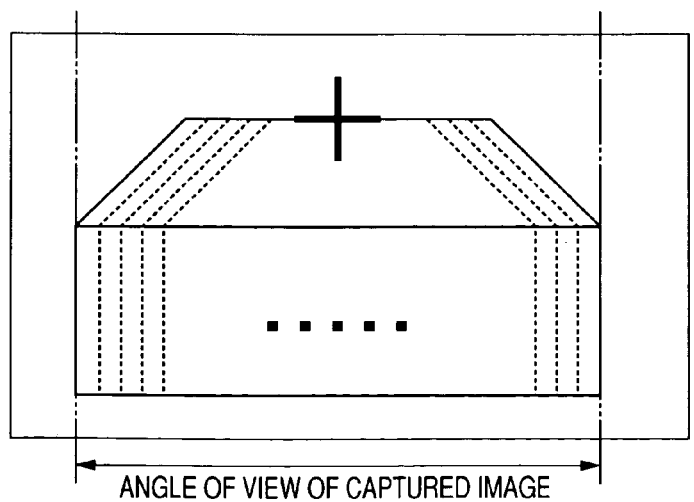
FIG. 8 illustrates thinning-out of picture elements from respective lines of the brightness measurement region.
Figure 9:
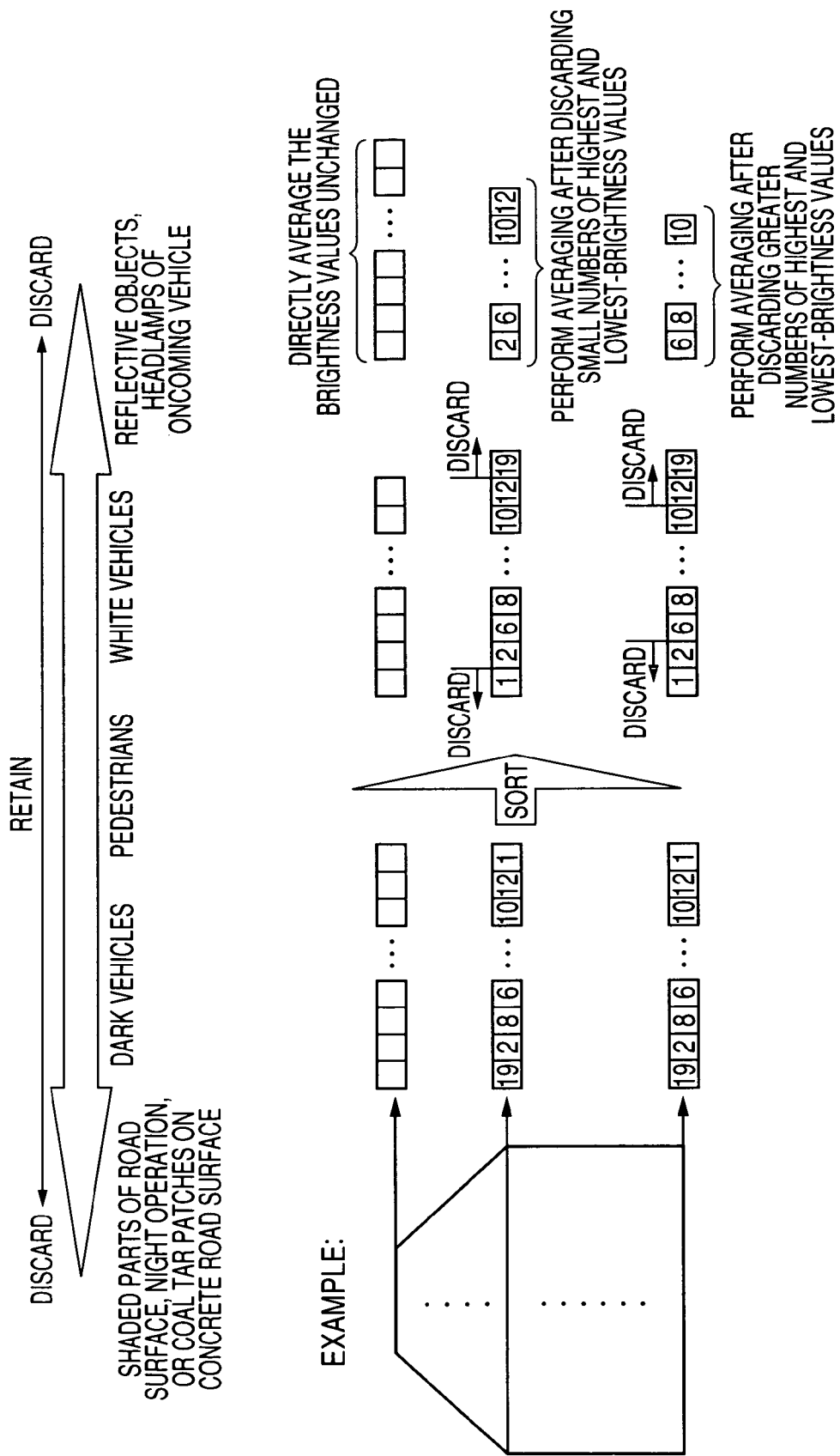
FIG. 9 illustrates exclusion of highest-brightness and lowest-brightness picture elements from each of respective lines of the brightness measurement region.

In addition, periodic thinning-out of picture elements within each line of the brightness measurement region is also performed, as indicated conceptually by the dotted-line portions in FIG. 8. With this embodiment, this periodic omission of respective picture elements (i.e., of luminance values corresponding to these picture elements) is performed at identical spacings within each picture line.

The luminance values of the picture elements of the brightness measurement region are then converted to respectively corresponding brightness values (i.e., indicative of brightness values in the external scene) by using the currently selected luminance control map and luminance control target value. Referring for example to diagram (b) of FIG. 2, assuming that a picture element value (luminance value) obtained from the camera 21 is K, then as indicated by the directions of the arrows, the corresponding converted brightness value is obtained as B by applying the currently selected luminance control map No. 7.

Next in step S132, for each picture line of the brightness measurement region, the picture elements are sorted in order of brightness value, then a fixed number of maximum-brightness picture elements and a fixed number of minimum-brightness picture elements of that line are excluded from further processing.

Assuming each of these fixed numbers is greater than one, the term "fixed number of maximum-brightness picture elements" as used in this description signifies "the maximum-brightness picture element and one or more picture elements having successively lower brightness than the maximum-brightness value". Similarly, the term "fixed number of minimum-brightness picture elements" signifies the lowest-brightness picture element and one or more picture elements having converted brightness values that are successively higher than the minimum value.

Although with this embodiment, the above exclusion processing is performed based upon judging converted brightness values of picture elements, it would also be possible to perform the exclusion processing based upon judging the luminance values, i.e., the picture element values as obtained from the camera 21.

Figure 10:
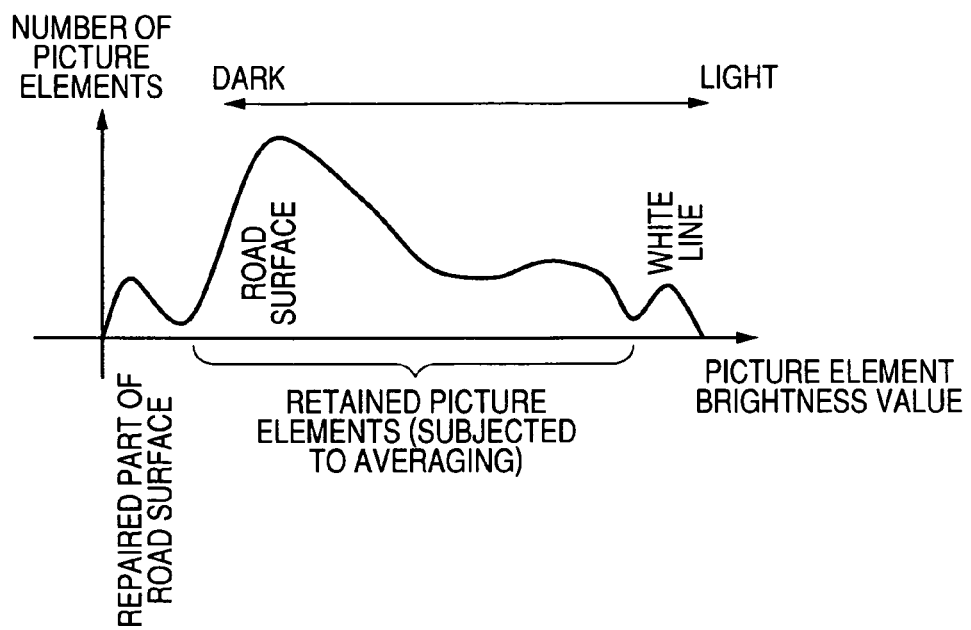
FIG. 10 is a diagram showing an example of distribution of brightness values in an image captured by a vehicle-mounted camera.

In the case of a road surface having a light coloration, such as a concrete surface, dark regions on the surface (such as portions repaired with coal tar, or joints in the roadway) are an obstruction to reliably measuring the brightness of the road surface. In the case of a dark road surface, e.g., formed of asphalt, white lines that are formed on the surface will similarly hinder reliable measurement of the brightness of the road surface. This is illustrated by the example of the distribution of brightness values of picture elements, for the case of a forward-view image of a road, shown in FIG. 10. With this embodiment, since highest and lowest brightness values of the brightness measurement region are excluded from further processing as described above, such problems due to excessively light or excessively dark regions on the road surface can be overcome.

In the case of a part of the road surface that is close to (directly ahead of) the local vehicle, it is possible to comparatively reliably distinguish excessively high or low brightness values resulting from white lines, coal tar patches, etc., on the road surface. However in the case of a part of the road surface that is distant from the local vehicle, it becomes difficult to distinguish such regions. For that reason, the farther the distance represented by the image position of a picture line (i.e., the higher the location of that line within the brightness measurement region) the smaller is made the number of picture element values that are excluded from the line by the exclusion processing described above. In the case of the picture lines corresponding to the most distant part of the brightness measurement region, no picture element values are excluded.

Figure 11:
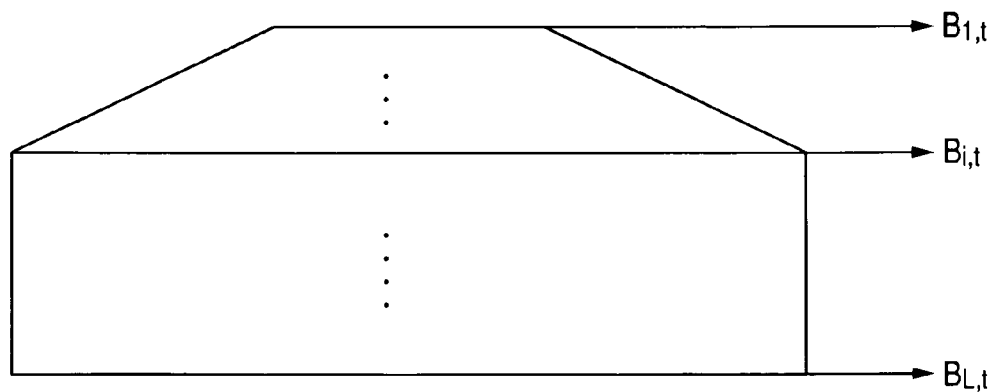
FIG. 11 illustrates the derivation of average brightness values of respective lines of picture elements in the brightness measurement region.

Next in step S133 as illustrated in FIG. 11, for each of the remaining picture lines of the brightness measurement region, the average of the converted brightness values of the picture elements of the line is calculated, and the calculated value is stored in memory for use in subsequent time-axis filter processing (described hereinafter). The resultant respective average values of the picture lines of the brightness measurement region of the current captured image are designated as $B_{i,t}$, where "i" denotes the position of the corresponding line within the brightness measurement region in a range from 1 to L, counting from the top of the brightness measurement region (as illustrated in FIG. 11), i.e., $1 \leq i \leq L$. The subscript portion "t" denotes the time-axis position of a picture element (spatial-domain) average value, e.g., expressed as a sequence number within a series of images successively captured at periodic time points up to the current time point.

By excluding the highest and lowest luminance values from this averaging processing it is ensured that, for each of the picture lines of the brightness measurement region, the (spatial) average brightness values of respective lines will vary in a more stable manner over time.

Next in step S134, for each of the L picture lines of the brightness measurement region, buffering is performed of the respective average luminance values that have been obtained for that picture line in a plurality of successively obtained images, using a buffer interval of (t~t–T). That is, for each of the picture lines, a set of T (spatial-domain) average values which have been previously successively calculated and stored at respective time points are acquired (read out from memory) and set in buffer registers, to be subjected to averaging calculation. These buffered average values can be expressed as:

1st line: $B_{1,t} \ldots B_{1,t-T}$
i-th line: $B_{i,t} \ldots B_{i,t-T}$
L-th line: $B_{L,t} \ldots B_{L,t-T}$ If for example the buffering interval is 4, then for each of the picture lines in the range 1 to L, the corresponding respective average brightness values that have been stored in the memory section 12 for four successive images are acquired as the buffered average values for that picture line.

Next in step S135, time-axis filtering (i.e., smoothing by averaging processing) is applied to each of selected picture lines of the brightness measurement region (these picture lines being selected as described hereinafter). The time-axis filtering is performed by obtaining, for each of the selected picture lines, the average of the buffered values that have been acquired in step S134, i.e., assuming a continuous set of L lines:

1st line: $B_{1,t} \ldots B_{1,t-T} \rightarrow F_{1,t}$
i-th line: $B_{i,t} \ldots B_{i,t-T} \rightarrow F_{i,t}$
L-th line: $B_{L,t} \ldots B_{L,t-T} \rightarrow F_{L,t}$ It can be expected that there will be only a small degree of variation in the average brightness values of picture lines corresponding to a region that is close to (is immediately ahead of) the local vehicle, since the brightness of such a region will generally be determined by reflection of light from the road surface. Hence, little or no time-axis filtering is applied to picture lines of such a part of the brightness measurement region. However in the case of picture lines corresponding to a region that is distant from the local vehicle (i.e., is close to the FOE), there may be large amounts of time-axis variations in the successive average brightness values that are obtained for these picture lines. As described above referring to FIG. 17, these variations can result from effects such as pitching of the local vehicle while light received from tail lamps or headlamps of opposing vehicles is affecting the brightness measurement region, thereby causing large fluctuations in the successive average brightness values that are measured for these picture lines corresponding to a distant region, with these fluctuations (i.e., the degree of time-axis dispersion of successive brightness values) tending to increase in accordance with increasing distance of the interfering light sources.

For that reason when time-axis filtering is applied to a picture line corresponding to a region that is close to the FOE, a comparatively long buffer interval is used, for example corresponding to approximately 700 ms, i.e., averaging is performed using a large number of successively obtained values (large value of T), to thereby increase the filtering effect (increase the degree of smoothing).

This is made possible since with this embodiment, time axis filtering can be applied individually to respective picture lines of the brightness measurement region.

Figure 12:
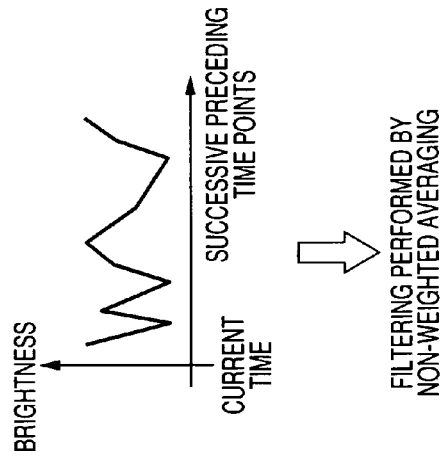
FIG. 12 illustrates a manner in which the strength of time-axis filtering applied to successively obtained average brightness values of respective lines of picture elements in the brightness measurement region is determined.

The above selective application of time-axis filtering to picture line average brightness values in accordance with distance from the local vehicle is illustrated in FIG. 12. As indicated, the greater the distance of an imaged region (that is, the higher the position of the corresponding picture lines within the brightness measurement region), the higher is made the effectiveness of the time-axis filtering against noise (dispersed fluctuations in brightness).

Conversely, no time-axis filtering is applied to the average brightness values of picture lines in the part of the brightness measurement region that is closest to the local vehicle.

However it is also necessary that the apparatus be able to rapidly follow sudden changes in the scene brightness, in particular, the road surface brightness, which can occur when the local vehicle enters or leaves a tunnel, etc. Hence for each of the picture lines of the brightness measurement region, the time-axis filtering is selectively applied in accordance with the form of variations in the successive average brightness values obtained for that line. This is done in order to suppress fluctuations in the successive capture-objective brightness values while at the same time achieving a fast reaction to sudden changes in external scene brightness. This processing is applied to each of the picture lines of the brightness measurement region.

Figure 13B:
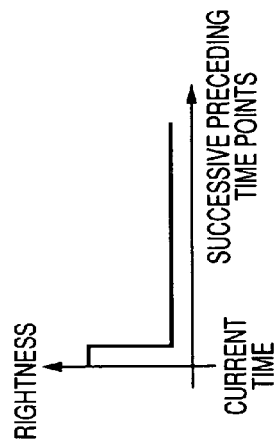
FIG. 13 shows diagrams illustrating an operation of judging whether or not time-axis filtering is to be applied to a picture element line in the brightness measurement region.
Figure 13C:
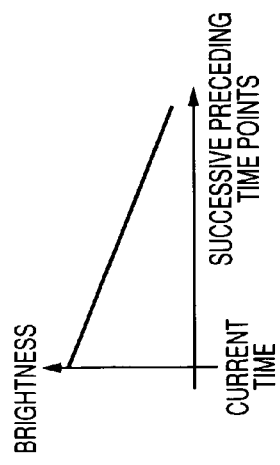
Figure 13A:
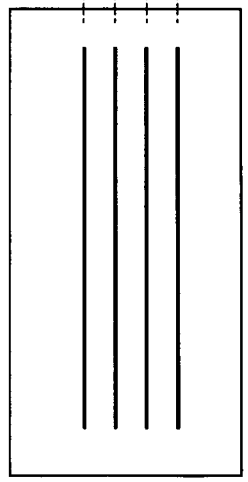

Specifically with this embodiment, if the successive average brightness values that are obtained for a picture line are found to be changing gradually over time as in the example of diagram (a) of FIG. 13, i.e., along a trend, without dispersion of values, then time-axis filtering is not applied. That is to say, the currently calculated average value obtained for that picture line is used directly in calculating the capture-objective brightness value (that calculation described hereinafter).

If it is found that dispersed fluctuations are occurring in the average values obtained for a picture line, as illustrated in diagram (b) of FIG. 13, then time-axis filtering by weighted median filtering is applied to a plurality of average values that have been successively obtained up to the current point in time for that picture line, and the result is used in the aforementioned calculation of the capture-objective brightness value. In all other cases, such as when the average values obtained for that picture line are successively varying as illustrated in diagram (c), time-axis filtering by non-weighted averaging is applied to such a plurality of average values, and the result used in the calculation of the capture-objective brightness value.

The term "weighted median filtering" as used herein signifies an averaging calculation in which greater weight is given to newer data than to older data.

The above processing performed in step S135 will be described more specifically in the following.

Assuming for example that T is 4, where the buffer interval is (t−0~t−T), the average brightness values of the i-th picture line within a buffer interval will be assumed to have the following magnitude relationships;

$$B_{i,t-1} < B_{i,t-3} < B_{i,t-2} < B_{i,t-4} < B_{i,t-0}$$

If either of the relationships of expression (1) below is satisfied, it is judged that dispersed fluctuations having an amplitude above a predetermined limit are occurring in the successive average values obtained for the picture line, i.e., if the absolute difference between the newest value and the mid-point value exceeds the half-width (DZW/2) of the dead zone multiplied by the time separation (T/2) between these values. In that case, weighted median filtering is applied.

$$\frac{B_{i,t-0} - B_{i,t-2}}{DZW/2} > \frac{T}{2} \text{ or } \frac{B_{i,t-0} - B_{i,t-2}}{DZW/2} < -\frac{T}{2} \quad (1)$$

If either of the relationships of expression (2) below is satisfied, then it is judged that a gradual variation (a trend) is occurring in the successive average brightness values of that picture line, so that time-axis filtering is not applied, i.e., if the absolute difference between the newest value and the mid-point value exceeds the width (DZW) of the dead zone multiplied by the time separation (T/2) between these values. Similarly, time-axis filtering is not applied if either of the relationships of expression (3) below is satisfied, i.e., if the absolute difference between the newest value and the oldest value exceeds the width (DZW) of the dead zone multiplied by the time separation (T) between these values.

$$\frac{B_{i,t-0} - B_{i,t-2}}{DZW} > \frac{T}{2} \text{ or } \frac{B_{i,t-0} - B_{i,t-2}}{DZW} < -\frac{T}{2} \quad (2)$$

$$\frac{B_{i,t-4} - B_{i,t-0}}{DZW} > T \text{ or } \frac{B_{i,t-4} - B_{i,t-0}}{DZW} < -T \quad (3)$$

In all other cases, time-axis filtering by non-weighted averaging is applied.

Next in step S136, as shown by equation (4) below, weighted-averaging processing is applied to the set of average brightness values (of respective picture lines) obtained by the selectively applied time-axis filtering of step S135. The result of this weighted-averaging processing will be referred to as the preliminary capture-objective brightness value, which is stored in memory for use in subsequent low-pass filter processing.

In equation (4), $F_{i,t}$ denotes the average brightness value of a picture line, and $W_i$ denotes a weighting value which is set for the picture line. With this embodiment, these weighting values are set as follows.

The preliminary capture-objective brightness value is obtained as a combination (with this embodiment, an average) of average values obtained for the picture lines of the target object-use region and for the picture lines of the road surface-use region. The brightness values within the road surface-use region (close to the local vehicle) are relatively stable, while those of the target object-use region are more variable. For that reason, when applying equation (4) to the picture line average brightness values of the road surface-use region, the respective weighting values W that are assigned in equation (4) are successively decreased in accordance with increasing closeness of the region represented by the picture line to the local vehicle. Conversely, when applying equation (4) to the picture line average values of the target object-use region, the value of W is decreased in accordance with decreasing distance of the picture line (i.e., of the region represented by the picture line). The value $B_{IMG,Temp,t}$ obtained from equation (4) will be referred to as the preliminary capture-objective brightness value.

$$B_{IMG\_Temp,t} = \sum_{i=1}^{L} W_i \times F_{i,t} \quad (4)$$

Next (step S137), a plurality of capture-objective brightness values that have been successively obtained up to the current point are evaluated, to determine the extent of dispersion of these values. If the dispersion is within a predetermined limit, then the preliminary capture-objective brightness value is subsequently used in performing exposure control. If the dispersion exceeds the limit, then low-pass filtering processing (described hereinafter) is applied and a capture-objective brightness value that is obtained as a result of this filtering is used in performing exposure control.

This low-pass filtering processing is performed to prevent brightness hunting.

Operation then proceeds to step S140 of FIG. 3.

Applying low-pass filtering to obtain the capture-objective brightness values can cause a lowering of response speed. Hence with this embodiment, the filtering is applied only when it is judged that there is excessive dispersion of successively obtained capture-objective brightness values. The allowable limit of dispersion of the successive capture-objective brightness values is determined based on the width of the dead zone, as described in the following.

Processing relating to the above low-pass filtering is performed in the following sequence of operations, in which P designates the number of precedingly obtained capture-objective brightness values that are used in evaluating the dispersion of the capture-objective brightness values:

[1] Buffering of capture-objective brightness values that have been successively measured at periodic time points up to the current point (buffer interval: t~t-P):

$$B_{IMG\#Temp,t} \ldots B_{IMG\#Temp,t-P}$$

[2] Respective differences between each of these capture-objective brightness values and the immediately-precedingly derived capture-objective brightness value are calculated, as shown by equation (5) below (buffer interval: 0~P−1):

$$\text{Diff}_0 = B_{IMG\_Temp,t} - B_{IMG\_Temp,i-1} \ldots \text{Diff}_{P-1} = B_{IMG\_Temp,i-(P-1)} - B_{IMG\_Temp,i-P} \quad (5)$$

[3] The number of alternations in that series of capture-objective brightness values is then calculated, i.e., the number of changes in sign between adjacent difference values (that is, between each pair $\text{Diff}_i$ and $\text{Diff}_{i-1}$ within the set of difference values $\text{Diff}_0 \ldots \text{Diff}_{P-1}$)

Figure 15:
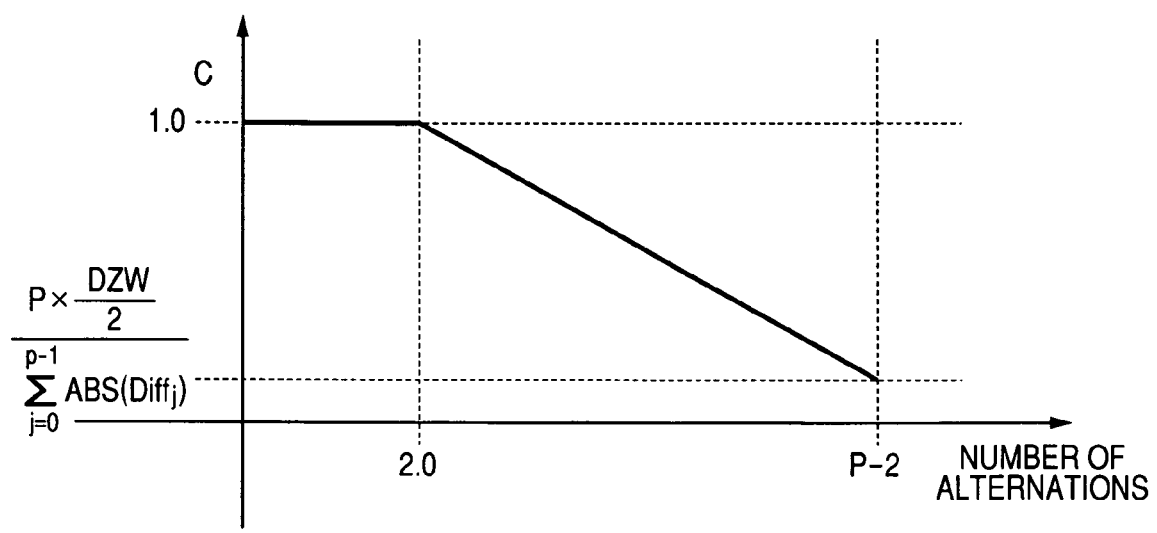
FIG. 15 is a graph which is used in evaluating the magnitude of fluctuations in successively obtained capture-objective brightness values in relation to a half-width value of the dead zone.

[4] The average absolute magnitude of the variations is evaluated in relation to the half-width DZW/2 of the dead zone. Specifically, if expression (6) below is satisfied, then it is judged that C=1.0 (where C is a parameter in equation (8) below). If expression (7) below is satisfied, then the value of C is obtained from the graph of FIG. 15.

$$\frac{\sum_{j=0}^{P-1} \text{ABS}(Diff_i)}{P} < \frac{DZW}{2} \quad (6)$$

$$\frac{\sum_{j=0}^{P-1} \text{ABS}(Diff_i)}{P} \geq \frac{DZW}{2} \quad (7)$$

[5] Low-pass filtering is then selectively applied, in accordance with equation (8) below, to obtain a capture-objective brightness value ($B_{IMG,t}$) for use in exposure control. That is to say, if the value of C is obtained as 1, then the preliminary capture-objective brightness value obtained in step S136 is subsequently used directly in exposure control. Otherwise (C<1), a low-pass filtering calculation is performed using at least one precedingly obtained capture-objective brightness value, and the result of this LPF processing is used in exposure control.

With this embodiment, the low-pass filtering calculation consists of multiplying the preliminary capture-objective brightness value by C and the immediately precedingly obtained capture-objective brightness value by (1−C), and summing the results, i.e.:

$$B_{IMG,t} = C \times B_{IMG\_Temp,t} + (1-C) \times B_{IMG,t-1} \quad (8)$$

This completes the processing of step S130 of FIG. 3.

It will be understood that the effect of deriving the value of C and then applying equation (8) is to:

(a) judge whether the amplitude of variations in a plurality of successively obtained capture-objective brightness values (obtained up to the current point) exceeds a predetermined limit value, (b) if the limit is not exceeded, use the preliminary capture-objective brightness value as a final value, and (c) if the limit is exceeded, perform a low-pass filter calculation, using the preliminary capture-objective brightness value, and select the result of that calculation to be the final value.

Next, in step S140, of FIG. 3, a decision is made as to whether the capture-objective brightness value obtained in step S130 is within the dead zone. If it is judged that the capture-objective brightness value is within the dead zone, the processing is ended. If the capture-objective brightness value is judged to be outside the dead zone range, step S150 is then executed in which a luminance control map is selected (as described hereinabove referring to diagram (b) of FIG. 2) in accordance with the capture-objective brightness value obtained in step S130 and the luminance control target value which was determined in step S110. Exposure control is then performed by setting the camera video amplifier gain and shutter speed in accordance with the selected luminance control map. Execution of the processing is then ended.

Figure 16:
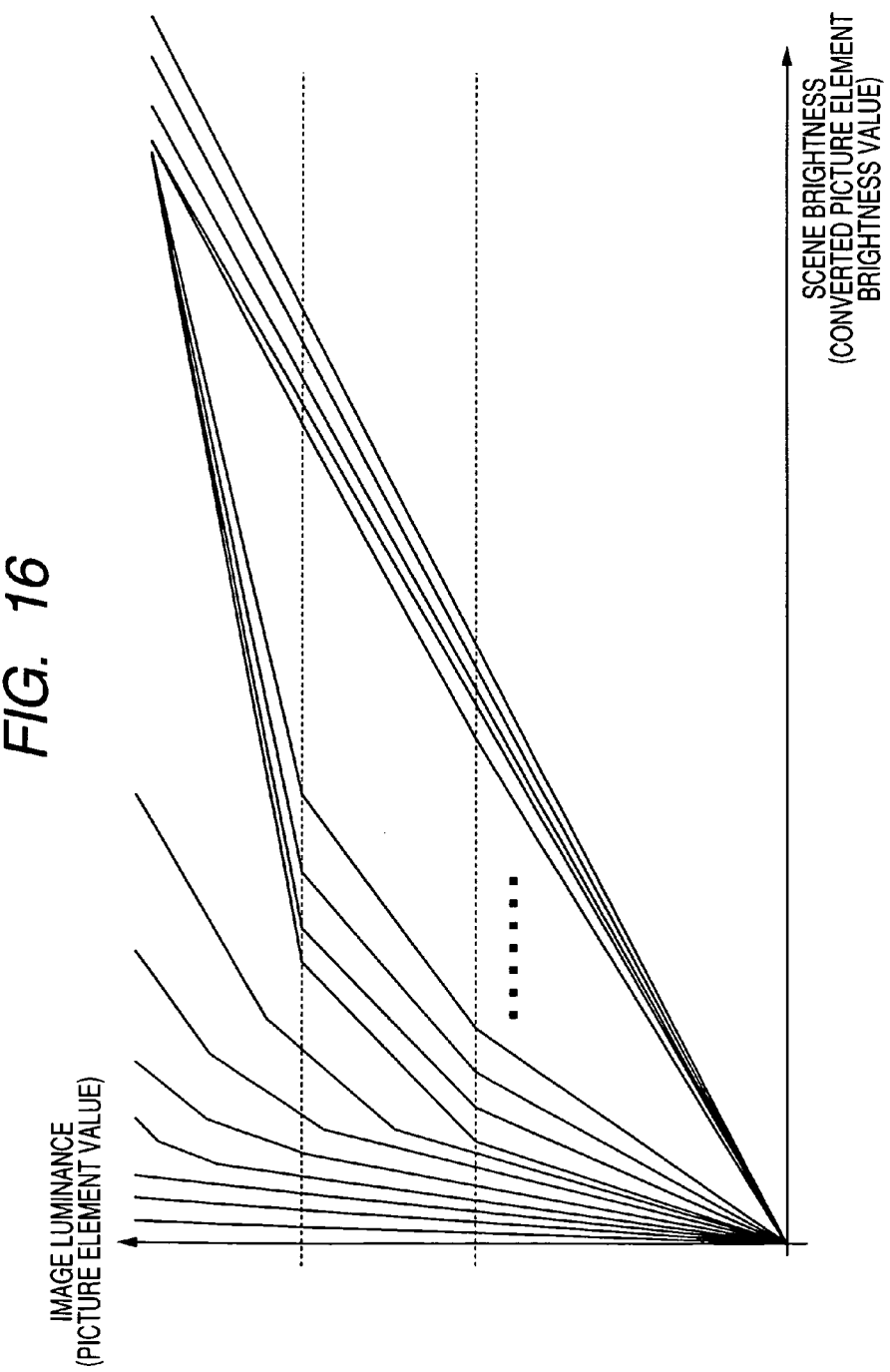
FIG. 16 shows an example of luminance control maps for enabling scene brightness measurement to be performed over a wide range of external scene brightness values.

The embodiment has been described above assuming that each of the luminance control maps have linear characteristics. However the camera 21 may be operated in a HDR (high dynamic range) mode, in which the range between minimum and maximum luminance values of the picture elements can correspond to a wider range of scene brightness values than in a normal mode. In that case, the luminance control maps may become of the form shown in FIG. 16, with bends formed in parts of the map characteristics. As a result of these non-linearities of the luminance control map characteristics, complex limitations may arise in the values of shutter speed and amplifier gain that can be utilized. For that reason it is desirable that the degree of change in the extent of bending, between adjacent luminance control maps is made small.

By using such luminance control maps for HDR operation, when a sudden large change in external scene brightness occurs (for example when the local vehicle enters a tunnel) the time which elapses until appropriate control of the camera exposure is achieved can be reduced.

Figure 6:
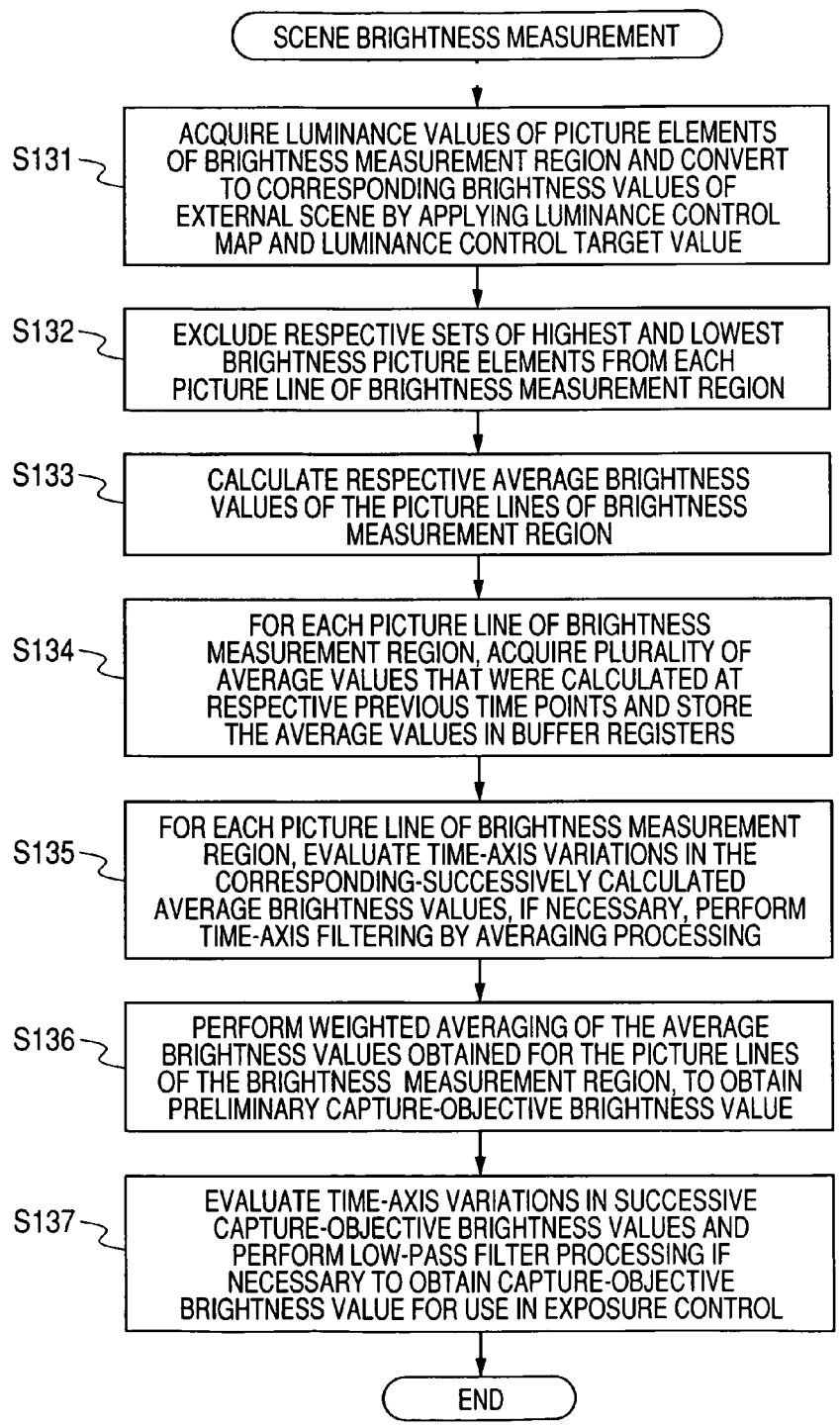
FIG. 6 is a flow diagram of processing for deriving a capture-objective brightness value, indicative of brightness in an external region ahead of a vehicle in which the embodiment is installed.

The processing of FIG. 6 above, for deriving a capture-objective brightness value for use in camera exposure control, can be summarized as follows:

Step S131: Picture elements constituting a brightness measurement region are extracted from a captured image in units of picture lines, with respective luminance values of the extracted picture elements being converted to brightness values.

Step S132, S133: For each of specific picture lines in the brightness measurement region (i.e., picture lines which are not excluded from further processing by thinning-out), the average brightness of the picture elements of the line is calculated.

Step S134, S135: For each of the non-excluded picture lines of the brightness measurement region, a plurality of average values which have been successively obtained for that picture line are evaluated, and if the dispersion of these average values exceeds a predetermined limit, time-axis averaging is applied to that plurality of average values, to obtain a current average value for use in further processing. The filtering effect (degree of smoothing) is increased in accordance with increasing distance of the external regions corresponding to the picture lines.

Step S136: Weighted averaging is applied to the set of average values obtained for respective picture lines, to obtain a preliminary capture-objective brightness value. The weighting values applied for respective picture lines are increased in accordance with increasing distance of the regions represented by the picture lines.

Step S137: Low-pass filtering processing is performed using the preliminary capture-objective brightness value and at least one precedingly obtained capture-objective brightness value, and either the result of this filter processing or the preliminary capture-objective brightness value is selected as a current measured brightness value, to be used in exposure control. This selection is determined in accordance with the extent of dispersion of successively obtained capture-objective brightness values (up to the current point).

With the described embodiment, each of the above operation steps S131~S150 is implemented by processing executed by a computer program. However it would be equally possible to implement at least some of these operation steps by dedicated hardware circuits. These operation steps are related to the contents of the appended claims as follows:

The CPU 11, in executing the processing of step S131, corresponds to extraction circuitry recited in the claims, while in executing the processing of steps S132 to S135 the CPU 11 corresponds to calculation circuitry recited in the claims. In executing the processing of steps S136 and S137 the CPU 11 corresponds to measurement circuitry recited in the claims, and in executing the processing of step S150 the CPU 11 corresponds to exposure control circuitry recited in the claims.

Effects Obtained

Figure 17:
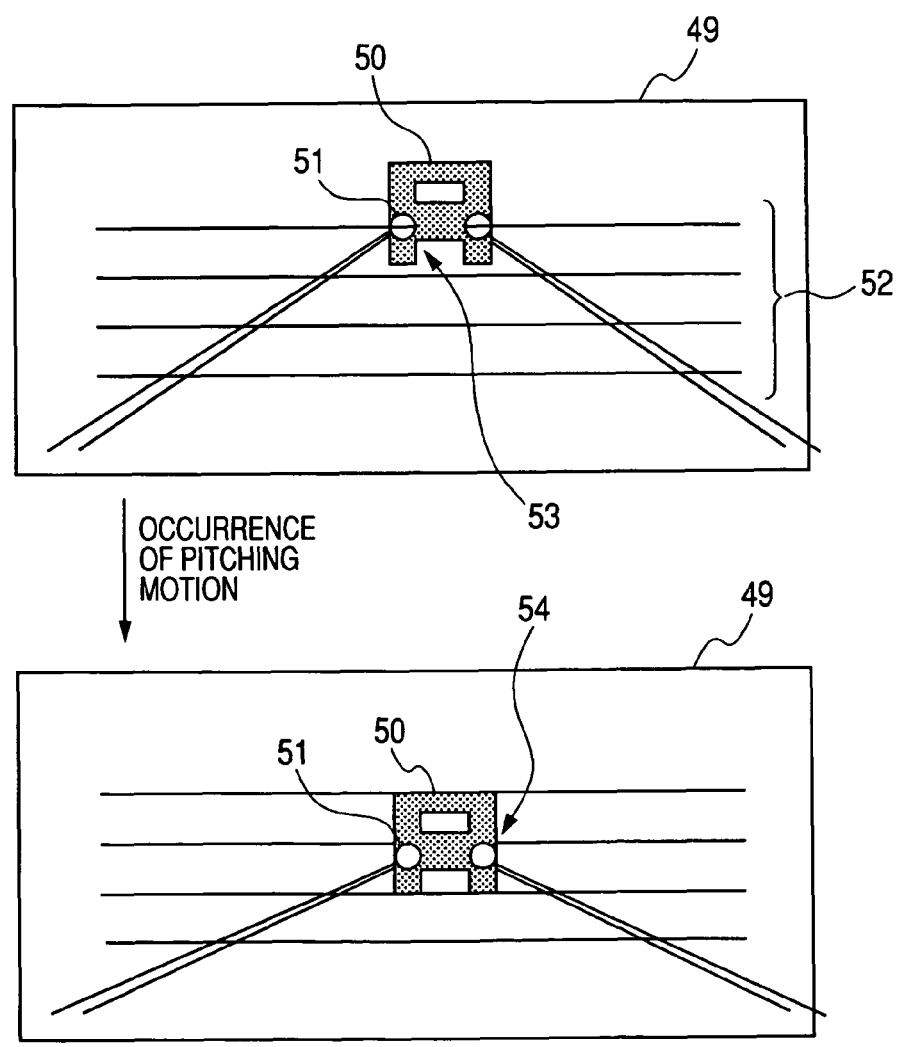
FIG. 17 shows diagrams for describing a problem which causes time-axis dispersion of successive brightness values within a captured image.

As can be understood from the above, with the exposure control apparatus 10 of this embodiment, fluctuations in measured brightness values, e.g., due to the effects described referring to FIG. 17, can be substantially reduced. This is achieved by applying time-axis filtering to average brightness values that are successively obtained for each of respective groups of picture elements (preferably, picture lines as described above) of an image. In general, these brightness fluctuations will occur most conspicuously in parts of a captured image that correspond to external regions (in a captured scene) that are relatively distant. For that reason, the strength of the time-axis filtering (degree of smoothing) is increased in accordance with increasing distance of the external regions corresponding to respective picture lines. Thus more stable and reliable brightness measurement can be achieved, so that improved exposure control can be achieved.

Furthermore with the above embodiment, a judgement is made separately for each of the picture lines, as to whether or not to apply such time-axis filtering processing, with the judgement being made based upon the extent of dispersion of a plurality of precedingly obtained average brightness values of that picture line. Hence the time-axis filtering is applied only when the extent of dispersion exceeds a predetermined limit. This ensures that application of the time-axis filtering will not result in an excessive lowering of the speed of reaction to sudden changes in brightness in the captured images (i.e., lowering of exposure control response speed).

Other Embodiments

The invention is not limited to the embodiment described above, and various modifications or alternative embodiments could be envisaged which lie within the scope claimed for the invention.

With the above embodiment the exposure control apparatus 10 applies time-axis filtering to a plurality of successively obtained average values of a picture line, only when it is judged that the extent of dispersion of these average values exceeds a predetermined limit. However it would be equally possible to always apply such time-axis filtering to the average values obtained for each of the picture lines, without making such a judgement.

Similarly, with the above embodiment, the exposure control apparatus 10 applies low-pass filter processing to derive a capture-objective brightness value that will be applied in exposure control, only when it is judged that the extent of dispersion of precedingly obtained capture-objective brightness values exceeds a predetermined limit. However it would be equally possible to always apply such low-pass filter processing, without making such a judgement.

Furthermore, although with the above embodiment, the exposure control apparatus 10 extracts respective picture lines (horizontal rows of picture elements) of each captured image to constitute a brightness measurement region, it would be equally possible to extract groups of picture elements for that purpose, in units other than picture lines.

Moreover, although the above embodiment has been described for application to a system for performing warning indication processing and steering control processing based upon recognition of a preceding vehicle, the invention is not limited to such a system, and could for example be applied to a system for performing warning indication processing and steering control processing, etc., based upon recognition of white lines (traffic lane markers) formed on a road surface.

Furthermore, the brightness measurement region of the above embodiment is described only as an example, and an appropriate form of brightness measurement region can be configured in accordance with the requirements of a particular system.

What is claimed is:

1. An exposure control apparatus for exposure control of an electronic digital camera installed on a vehicle, said camera disposed to periodically capture respective images of an external scene ahead of said vehicle, each of said images comprising an array of picture elements having respective luminance values, and said exposure control apparatus comprising circuitry configured to convert said luminance values to corresponding brightness values of said external scene in accordance with a predetermined relationship between an exposure condition of said camera, said luminance values and said brightness values;

wherein said exposure control apparatus comprises:
extraction circuitry configured to extract from each of said images a plurality of groups of picture elements to constitute a brightness measurement region,
calculation circuitry configured to calculate respective average brightness values of said plurality of picture element groups and, for each of said groups, apply time-axis filter processing to successively obtained average brightness values obtained for said group, to thereby effect smoothing of variations in said average brightness values,
measurement circuitry configured to calculate a capture-objective brightness value based on respective average brightness values obtained for said picture element groups following said time-axis filter processing, and
exposure control circuitry configured to perform exposure control of said camera in accordance with said capture-objective brightness value.

2. An exposure control apparatus according to claim 1, wherein said calculation circuitry is configured to increase an effect of said time-axis filter processing applied to respective ones of said groups, in accordance with increasing distance of external regions corresponding to said groups.

3. An exposure control apparatus according to claim 1, wherein said measurement circuitry is configured to apply low-pass filter processing using a plurality of successively obtained capture-objective brightness values, for obtaining a current capture-objective brightness value to be applied in said exposure control.

4. An exposure control apparatus according to claim 3, wherein said measurement circuitry is configured to;
obtain an amplitude of variations among a plurality of successively obtained ones of said capture-objective brightness values, and judge said amplitude in relation to a predetermined limit value of amplitude variation; and
selectively apply said low-pass filter processing in accordance with a result of said judgement.

5. A non-transitory computer-readable medium comprising instructions for execution by a computer, the instructions including a computer-implemented method for controlling exposure of an electronic digital camera installed on a vehicle, said camera disposed to periodically capture images of a scene ahead of said vehicle, each image comprising an array of picture elements having respective luminance values, the instructions implementing:

converting said luminance values to corresponding brightness values of said scene in accordance with an exposure condition of said camera, extracting from each of said images a plurality of groups of picture elements to constitute a brightness measurement region, calculating respective average brightness values of said plurality of picture element groups and, for each of said groups, applying time-axis filter processing to successively obtained average brightness values obtained for said group, with an effect of said time-axis filter processing being increased in accordance with increasing distance of external regions corresponding to said groups, calculating a capture-objective brightness value based on respective average brightness values obtained for said picture element groups following said time-axis filter processing, and performing exposure control of said camera in accordance with said capture-objective brightness value.

6. An exposure control apparatus for exposure control of an electronic digital camera installed on a vehicle, said camera disposed to periodically capture respective images of an external scene ahead of said vehicle, each of said images comprising an array of picture elements having respective luminance values, and said exposure control apparatus comprising circuitry configured to convert said luminance values to corresponding brightness values of said external scene in accordance with a predetermined relationship between an exposure condition of said camera, said luminance values and said brightness values;

wherein said exposure control apparatus comprises:

extraction circuitry configured to extract from each of said images a plurality of picture element groups to constitute a brightness measurement region;

calculation circuitry configured to calculate respective average brightness values of said plurality of picture element groups, for each group of said plurality of picture elements groups, obtain an amplitude of dispersed fluctuations in average brightness values within a plurality of successively obtained average brightness values corresponding to said group, judge said amplitude in relation to a predetermined limit amplitude, and selectively apply time-axis filtering processing, for obtaining a current average brightness value corresponding to said group, in accordance with a result of said judgment, to thereby effect smoothing of variations in said average brightness values;

measurement circuitry configured to calculate a capture-objective brightness value based on respective average brightness values obtained for said plurality of picture element groups following said time-axis filter processing; and exposure control circuitry configured to perform exposure control of said camera in accordance with said capture-objective brightness value.

7. An exposure control apparatus for exposure control of an electronic digital camera installed on a vehicle, said camera disposed to periodically capture respective images of an external scene ahead of said vehicle, each of said images comprising an array of picture elements having respective luminance values, and said exposure control apparatus comprising circuitry configured to convert said luminance values to corresponding brightness values of said external scene in accordance with a predetermined relationship between an exposure condition of said camera, said luminance values and said brightness values;

wherein said exposure control apparatus comprises:

extraction circuitry configured to extract from each of said images a plurality of picture element groups as respective picture lines each comprising a horizontal row of picture elements to constitute a brightness measurement region;

calculation circuitry configured to for each picture line of said respective picture lines, obtain an amplitude of dispersed variations in average value brightness values within a plurality of successively obtained average brightness values corresponding to said picture line, judge said amplitude in relation to a predetermined limit value of amplitude, and selectively apply time-axis filtering processing, for obtaining a current brightness value corresponding to said picture line, in accordance with a result of said judgment, to thereby effect smoothing of variations in said average brightness values;

measurement circuitry configured to calculate a capture-objective brightness value based on respective average brightness values obtained for said picture element groups following said time-axis filter processing; and exposure control circuitry configured to perform exposure control of said camera in accordance with said capture-objective brightness value.

* * * * *